April 6, 1965 P. ZOFFMANN 3,176,606
APPARATUS FOR SEPARATING HOP LEAVES FROM WORT
Filed March 6, 1963

INVENTOR.
PAUL ZOFFMANN
BY
ATTORNEY

United States Patent Office 3,176,606
Patented Apr. 6, 1965

3,176,606
APPARATUS FOR SEPARATING HOP LEAVES FROM WORT
Paul Zoffmann, 1310 Delaware Ave., Buffalo 9, N.Y.
Filed Mar. 6, 1963, Ser. No. 263,179
5 Claims. (Cl. 99—278)

The present invention relates to a process and to apparatus for separating hop leaves from wort at the end of the brewing process.

In all beer and ale breweries the actual brewing process ends invariably with the separation of the hop leaves from the maltose solution called "wort" in which the hops have been boiled and extracted in the course of the brewing process.

Since the hop leaves are solid and the wort is of relatively low viscosity, this separation can take place very easily in a container of adequate size having a perforated bottom and sides. The wort runs away and the hop leaves are retained in the container. They are sparged with hot water to wash out the last traces of adhering extract. Nevertheless, the subsequent removal of the big mass of boiling hot vegetable matter is difficult and time-consuming.

There are presently in use in the brewing industry various types of apparatus for the mechanical, continuous removal of the hop leaves from the wort. Since the hop leaves are not uniformly suspended in the wort coming from the brew kettle, relatively clear gusts of wort alternate with blobs of hop leaves flowing into the separator. Consequently all devices relying on perforated baffles for the separation of the hop leaves from the wort are subject to over-spilling, that is, the carrying over of hop leaves into the wort already sieved. Furthermore, with prior apparatus the fixed capacity of the elements for the washing-out of the extract are not always adequate because the concentration of the extract of the wort varies. Hence, in some instances there is loss of valuable extract. Furthermore, the barrel capacity of each brew house is subject to wide variations. Moreover, within the same brew house the hop-dosage per barrel brewed is by no means constant. Mechanical hop strainers or sieves have, therefore, to be built with a specified capacity in barrels as well as a specified capacity for pounds of hops. When either of these factors exceeds some rather narrow limits, the hop-sieve cannot work with optimum efficiency.

One object of the present invention is to provide a self-emptying hop-sieve constructed so that clean separation of the hop leaves from the wort is accomplished in the very first stage of operation of the apparatus, excluding the possibility of overspilling, regardless of the uniformity or lack of uniformity of the suspension coming from the brew kettle.

Another object of the invention is to provide apparatus of the character described with which complete leaching of the extract from the hop leaves is obtainable with the least amount of hot water.

A further object of the invention is to provide apparatus of the character described having a wide range of operating capacity so as to be able to handle in a given time more barrels of wort and pounds of hops than is possible with apparatus of this nature now on the market.

Other objects of the invention will be apparent hereinafter from the specification and from the recital of the appended claims, particularly when read in conjunction with the accompanying drawing.

Figure 1:
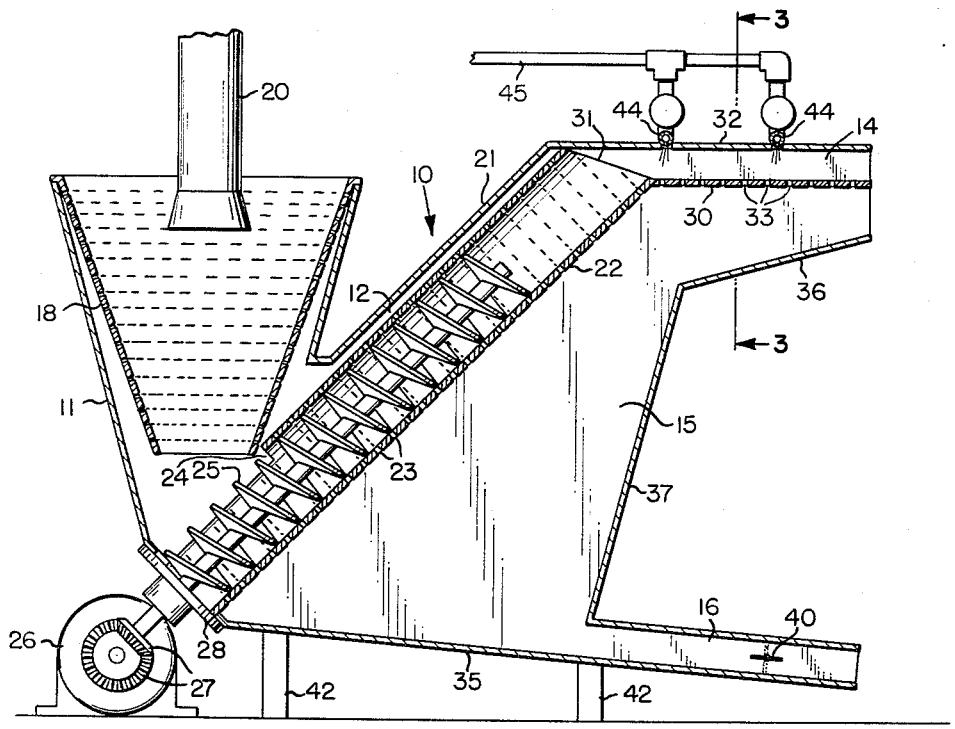
FIG. 1 is a more or less schematic, vertical section through apparatus built according to one embodiment of this invention for separating hop leaves from wort.
Figure 2:
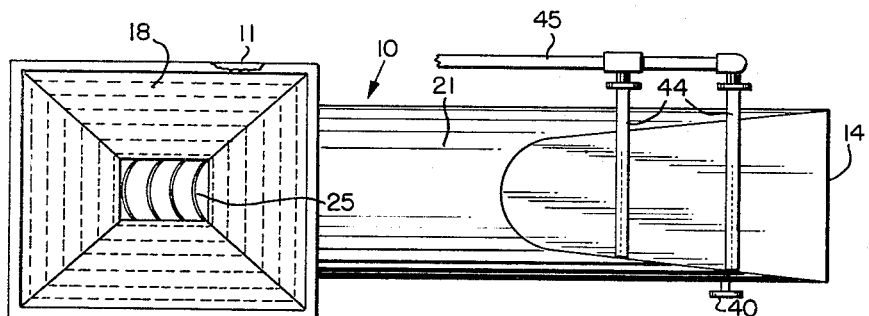
FIG. 2 is a plan view of this apparatus.
Figure 3:
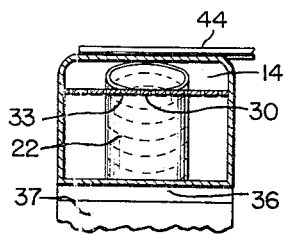
FIG. 3 is a section on the line 3—3 of FIG. 1, looking in the direction of the arrows.

Referring now to the drawing by numerals of reference, 10 denotes generally apparatus built according to one embodiment of this invention. This apparatus comprises a hopper section 11, an elevator section 12, a discharge section 14 for the extracted hop leaves, a container section 15 for receiving the extracted wort, and a discharge tube 16 through which the wort flows from the separator for further treatment.

The wort, carrying in suspension the hop leaves, is delivered directly from the brew kettle into an inverted pyramidal shaped sieve 18, which is removably mounted in the hopper 11, through a conduit 20. Mounted in the container 15 in juxtaposition to the inclined upper wall 21 thereof is a tube 22, which is cut away at its lower end on its upper side, as denoted at 24, to communicate with the hopper 11. The tube 22 is perforated around its periphery, as denoted at 23.

The sieve 18 is open at its bottom so that the hops can drop therethrough; and the perforations in the side walls of the sieve permit the wort to run off quickly from the sieve into the container 15. Hence the separation of the hop leaves from the wort begins immediately upon delivery of the suspension by tube 20 into the hopper.

Rotatably mounted within the tube 22 is a screw conveyor 25, which is adapted to receive the hop leaves from the hopper and to carry them upwardly in the tube 22. The opening in the bottom of the sieve 18 registers with the opening 24 in the tube 23; and the area of the opening at the bottom of the sieve is preferably less than, but in any case no greater than, the area of the opening 24 so that all of the hop leaves dropping out of the bottom of the sieve fall into tube 22 onto screw conveyor 25, and none falls into the container section 15. The screw conveyor is driven in any suitable manner as, for instance, by a motor 26 and a bevel gear reduction 27.

At its upper end, the tube 22 communicates with a trough 30, which has a mitered connection with the tube at 31 and which forms, with the top wall 32 of the container, a tube which is rectangular in cross section and whose height is preferably only about one-half the diameter of the tube 22, but whose width is preferably two to three times the diameter of this tube. The trough 30 is perforated around its free perimeter, as denoted at 33, so that the wort can readily flow therefrom into the container 15.

The container 15 can itself be of any suitable shape. As shown it has a bottom wall 35, which is inclined downwardly from left to right in FIG. 1 and which forms part of the discharge tube 16. The right-hand side wall of the container has a top portion 36 that is inclined downwardly from right to left, and that joins another portion 37 which is slightly inclined to the left from top to bottom. However, as stated, the shape of the container is not material so far as the present invention is concerned.

Mounted in the discharge tube 16 for the wort is a manually adjustable valve 40 for controlling the rate of flow of the wort from the tube.

The container may be mounted on legs 42, or in any other desirable manner.

For extracting the wort completely from the hop leaves, hot water can be delivered into the discharge section 14 from spray pipes 44 through openings 45 in the top wall 32. The hot water for spraying is delivered to the spray pipes 44 through the pipe 45.

In operation, the wort and hops entering the hopper 11 will separate rapidly. Thus, the hopper can be kept relatively small in size. The wort will run off readily through the perforations 23 in the tube 22 while the hops will be retained and moved, that is, lifted by the revolving screw conveyor 25 to the top of the perforated tube 22. The screw conveyor may be driven at any desired r.p.m. Any lack of uniformity of the suspension of hops in the wort flowing to the hopper is of no consequence since a slight jamming of the hop leave mass occurs anyway at the miter junction 31. The weight of the hop leaves ascending, and the mentioned slight "jamming," will all tend to squeeze the remnants of the wort out of the hop leaves. They will all arrive fairly dry under the washing sprayers 44.

The discharge section for the hop leaves may be rectangular in cross section, as stated, but instead of being of uniform height as shown in FIG. 1 may gradually decrease in height to the discharge port. Because of the increased width of the discharge section, as compared with the diameter of tube 22, the pressed hop leaves will be spread wide and flat to facilitate percolation of the hot sparging water therethrough, and to make the layer of hops thinner. The hop leaves will arrive fairly dry under the washing sprayers 44, and since the leaves are spread out horizontally, they will be thoroughly rinsed-washed in their passage under the hot water sprays.

The present apparatus permits sparging of the hops as they pass through the discharge section of the apparatus, for those brewers who practice sparging. At the end of the discharge section the spent hops may drop by gravity to waste, or to a shredder; or they may be directed as desired by conveyors, chutes, etc.

With the apparatus described, no overspilling of hop leaves into the strained wort is possible. Secondly, the washing effect can be regulated by the speed at which the screw conveyor 25 is driven as well as by the amount (pressure) of the hot water supplied to the discharge section of the apparatus. Thirdly, since the screw conveyor lifts (moves) only the amount of solids fed to it, if not much material is coming, it will run empty or half empty; and if much is coming it will run full. In both instances, the jamming effect at the miter 31 will be about the same. Adjustments can be effected by varying the r.p.m. of the screw conveyor.

The screw conveyor lifts the solids (the hops) in the very first phase of the operation out of the wort. In one motion, moreover, the hops are being lifted, squeezed and leached. By increasing the length of the screw to the top of the tube 22, instead of having the screw terminate short of the top as shown in the drawing, squeezing can be eliminated as is desirable for some types of beer. By changing the pitch of the screw, or narrowing the discharge section of the apparatus, the compression on the hops can be increased.

The apparatus of the present invention is of simple design; and maintenance requirements are at a minimum. The arduous, unpleasant task of shoveling and raking hops, in the old fashioned processes of separating hops from wort, is completely eliminated.

Cleaning of the apparatus is a relatively simple task, and can be effected readily. The sieve 18 can easily be lifted out of the hopper 11 for cleaning. The screw 25 can also be readily removed for cleaning, where necessary, by removing cover 28, which may be removably secured for this purpose by bolts or screws to the container, and by pulling the screw down through the opening thus provided; motor 26 can be swung out of the way if necessary.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. Apparatus for separating hop leaves from wort comprising
    (a) a hopper into which wort with hop leaves in suspension can be delivered, said hopper having perforated side walls through which wort can drain out and being open at its bottom,
    (b) a container for the wort into which said hopper extends,
    (c) an inclined tube mounted within said container and extending upwardly from a point adjacent the bottom of said container to a point adjacent its top, said tube having an opening on its upper side which registers with the opening in the bottom of said hopper and which is of an area at least as great as the area of the opening in the bottom of said hopper so that all of the material dropping out of the hopper enters said tube, said tube being perforated along its length so that wort can flow therefrom into said container,
    (d) a conveyor screw rotatably mounted in said tube,
    (e) means for rotating said screw to convey hop leaves upwardly through said tube, and
    (f) an enclosed tubular conduit connected at one end at an acute angle to the upper end of said tube to restrict the flow of the hop leaves from the tube into said conduit thereby to squeeze wort out the hop leaves, said conduit having a discharge port through which the hop leaves are discharged.

2. Apparatus as claimed in claim 1, having spargers positioned to spray liquid on the hop leaves as they move through said conduit to wash them, and said conduit is perforated to permit flow of the liquid into the container.

3. Apparatus as claimed in claim 2, wherein the tube is circular in cross-section and the conduit is rectangular in cross-section and its height is less than the diameter of the tube and its width is greater than the diameter of the tube.

4. Apparatus as claimed in claim 3, wherein the tube and the screw are inclined at an angle of approximately 45° to the horizontal.

5. Apparatus as claimed in claim 3, wherein the conduit gradually decreases in area from the tube to its discharge port.

References Cited by the Examiner
UNITED STATES PATENTS

| | | |
|---|---|---|
| 581,354 | 4/97 | Lapp. |
| 1,048,853 | 12/12 | Muntzing. |
| 2,471,517 | 5/49 | Chaffee _____ 210—415 |

FOREIGN PATENTS

| | | |
|---|---|---|
| 751,551 | 6/33 | France. |
| 499,020 | 11/54 | Italy. |
| 535,709 | 11/55 | Italy. |

ROBERT E. PULFREY, *Primary Examiner.*